United States Patent [19]

Stern et al.

[11] 4,222,067
[45] Sep. 9, 1980

[54] TAMPER-RESISTANT TELEVISION SIGNAL SCRAMBLING

[76] Inventors: Joseph L. Stern, 27 W. 96th St., New York, N.Y. 10025; Joseph Garodnick, 1 Wall St., Fort Lee, N.J. 07024

[21] Appl. No.: 918,645

[22] Filed: Jun. 23, 1978

[51] Int. Cl.² .................. H04N 7/16; H04K 1/02
[52] U.S. Cl. .................. 358/118; 358/114; 358/120
[58] Field of Search .................. 358/118, 120, 114

[56] References Cited

U.S. PATENT DOCUMENTS

| | | | |
|---|---|---|---|
| 2,905,747 | 9/1959 | Kidd et al. | 358/121 |
| 3,202,758 | 8/1965 | Brownstein | 358/118 |
| 3,347,982 | 10/1967 | Bass et al. | 358/118 |
| 3,760,097 | 9/1973 | Burroughs et al. | 358/118 |
| 3,896,262 | 7/1975 | Hudspeth et al. | 358/118 |
| 4,074,311 | 2/1978 | Tanner et al. | 358/118 |

*Primary Examiner*—S. C. Buczinski
*Attorney, Agent, or Firm*—Darby & Darby

[57] ABSTRACT

A method and apparatus for blocking the reception of a subscription television program while substituting a replacement program at a blocked receiver, provide security against detuning an unauthorized receiver to receive the subscription program. A security carrier signal is provided in a subscription television signal at the frequency of the audio carrier of the lower adjacent channel and is alternately amplitude modulated with bursts from first and second interference frequencies at a third or keying frequency. The television signal also includes an interfering carrier signal intermediate the audio and video carriers in the channel and the interfering carrier is modulated with a substitute television program. When a receiver is properly tuned to the channel, the security carrier has no effect on reception and either the subscription or substitute program is received, depending on whether the receiver is authorized or not. Should an attempt be made to receive the subscription program in an unauthorized receiver by detuning the receiver, the security carrier interferes with or blocks video reception in the detuned receiver and the modulation of that carrier produces a moving visual pattern which is extremely annoying to a viewer.

46 Claims, 7 Drawing Figures

TAMPER-RESISTANT TELEVISION SIGNAL SCRAMBLING

The present invention relates generally to television communication systems and, more particularly, concerns a method and apparatus for scrambling subscription television programs so that an unauthorized receiver will not receive an intelligible television program, which method and apparatus can not be circumvented by channel tunning adjustments of an unauthorized receiver.

As used herein, the term "subscription television system" is intended to encompass all television communication systems in which a television program signal, which is recoverable by a general group of television receivers, is intended to be recovered by only specific authorized ones of the receivers. The descriptive term "subscription television" is intended to be similarly broadly interpreted.

In conventional television broadcasting and cable systems, each transmitter station is assigned a channel having a predefined frequency bandwidth. The signal produced by each station includes an audio carrier signal and a video carrier signal disposed near opposite ends of the assigned channel and modulated, respectively, to carry the audio and video portions of the program. By convention (in the United States), commercial television channels are 6 megahertz wide and the video and audio carriers are disposed, respectively, at 1.25 megahertz and 5.75 megahertz above the lower boundary of the channel. Also by convention, video information is amplitude-modulated onto the video carrier and audio information is frequency-modulated onto the audio carrier.

In subscription television systems (for example, in modern cable television systems), it is customary to withhold a program from an unauthorized receiver or to provide the program to the receiver while conditioning the program signal so that is is unintelligible unless received by an authorized subscriber. Various methods have been suggested for scrambling a television signal to render it unintelligible, including the injection into the television signal to radio frequency (RF) spoining signals or "tones" to interfere with the reception of the signal.

In our copending U.S. patent application Ser. No. 756,816 filed Jan. 5, 1977, now U.S. Pat. No. 4,099,203, we disclose a television signal scrambling method and apparatus in which an RF spoiling signal, serving as an interfering carrier, is provided intermediate the audio and video carriers and is modulated with a substitute television signal. At an unauthorized receiver, the interferring carrier blocks reception of the subscription television signal and the substitute program is received. At an authorized receiver, a band elimination filter or other frequency eliminating device is provided ahead of the receiver and is tuned to the interferring carrier, thereby extracting it before the signal reaches the receiver. As a result, the subscription program is received at an authorized receiver without interference from the interferring carrier.

In practice, it has been found that a television receiver may be sufficiently detuned (i.e. tuned away from its nominal frequency setting for the channel to be received) to place the interfering carrier outside of the reception band of the receiver. Although such detuning also shifts the audio carrier out of the audio reception band, it also results in sufficient attenuation of the interferring carrier to permit reception of the video portion of the subscription program because the video is not shifted out of the reception band. As a consequence, it would be possible to detune two television receivers in opposite senses so that one receives the audio portion of the subscription program and the other recieves the video portion of the subscription program, while both receivers attenuate the intefering carrier sufficiently to eliminate its effect on picture reception. In using one receiver for audio and one for video (black and white only, as will be explained below), the entire subscription program can be reconstructed and viewed by an unauthorized party.

Broadly, it is an object of this invention to prevent scrambling of a subscription television program to be circumvented by detuning one or more conventional television receivers. More specifically, it is within the contemplation of the present invention to provide a method and apparatus for conditioning a scrambled subscription television program signal to prevent its reception by unauthorized receivers by detuning the same, while avoiding any perceptible degadation of the subscription television program received at an authorized receiver.

It is another object of this invention to provide a method and apparatus for scrambling or blocking both the audio and video portions of a subscription television signal while permitting the introduction of a replacement program signal having audio and/or video components, which method and apparatus can not be circumvented by detuning one or more authorized receivers and which produce no appreciable degradation of the subscription television program received at an authorized receiver.

It is a further object of this invention to provide a method and apparatus of the type described which can be employed in existing subscription television systems with a minimum of modifications.

It is also an object of this invention to provide apparatus of the type described which is efficient, convenient and reliable in use, yet relatively inexpensive and simple in construction.

In accordance with one aspect of the present invention, a subscription television signal which has been conditioned for reception by authorized receivers only is provided with a security carrier signal at a frequency which is outside the reception band of the television receiver for the selected channel and which is also sufficiently remote from the reception band to avoid interference with the program when the receiver is correctly tuned to the channel. However, the security carrier is sufficiently close in frequency to the reception band to be drawn into it if an attempt is made to detune the television receiver. This permits the conditioned television signal to be received at a properly tuned receiver (either in scrambled or unscrambled form depending on whether the receiver is unauthorized and authorized). However, the security carrier interferes with or blocks reception of the television signal, should an attempt be made to circumvent scrambling by detuning.

In accordance with another aspect of the present invention, the security carrier is alternately modulated with a plurality of different low frequency signals. As a consequence, when the television receiver is detuned and the security carrier is drawn into the reception band, the receiver displays a moving interference signal which is extremely annoying to a viewer.

In illustrative embodiments demonstrating objects on features of the present invention, a security carrier signal is provided in a subscription television signal at the frequency of the audio carrier of the lower adjacent channel and is alternately amplitude modulated with bursts from first and second interference frequencies at a third or keying frequency. The television signal also includes an interfering carrier signal intermediate the audio and video carriers in the channel and the interfering carrier is modulated with a substitute television program. When a receiver is properly tuned to the channel, the security carrier has no effect on reception and either the subscription or substitute program is received, depending on whether the receiver is authorized or not. Should an attempt be made to receive the subscription program in an unauthorized receiver by detuning the receiver, the security carrier interferes with or blocks video reception in the detuned receiver and the modulation of that carrier produces a moving visual pattern which is extremely annoying to a viewer.

The foregoing brief description, as well as further objects, features and advantages of the present invention, will be more completely understood from the following detailed description of a presently preferred, but nonetheless illustrative, embodiment in accordance with the present invention, with reference being had to the accompanying drawings in which.

In our aforementioned patent, we disclosed that when an interference carrier signal is injected into a conventional television signal at any of a predefined set of frequencies intermediate the video and audio carrier signals, the interfering carrier signal will not only block normal reception of the conventional television signal, but, if appropriately modulated, can provide a replacement progam signal for the conventional television signal. This phenomenon is believed to result from the non-linear response of a conventional television receiver to the various carrier signals (i.e. audio, video and interfering carrier signals) present in the composite RF television signal. A receiver having a non-linear response products beat frequencies between various frequency components present in the several RF signals applied to the television receiver and also produces harmonics of the beat frequencies. Moreover, experimentation has shown that blocking of the normal television signal and the substitution of a replacement signal will occur when the frequency difference between the audio and video carrier signals of the normal television signal (i.e., 4.5 MHz) is an integral multiple (preferably a low multiple) of the frequency difference between the interfering carrier signal and either the video or audio carrier signal (i.e., when the frequency difference between the interfering carrier signal and one of the other carrier signals is an integral submultiple of the intermediate frequency for the conventional "intercarrier" audio detection system). When an interfering carrier signal of any of the above-defined frequencies is appropriately frequency-modulated with replacement audio signals, these audio signals will replace the regular audio program signals and will be reproduced by the receiver. Substitution of replacement video program material can be obtained with the same interfering carrier frequencies by appropriately amplitude-modulating the interfering carrier by the replacement video program signals.

As will be explained below, it has been found that a conventional television receiver, by being intentionally detuned, could be operated to receive either the audio or video portions of the normal or subscription program, thereby circumventing, at least partially, the intended scrambling effect of the interfering carrier signal.

Figure 1:
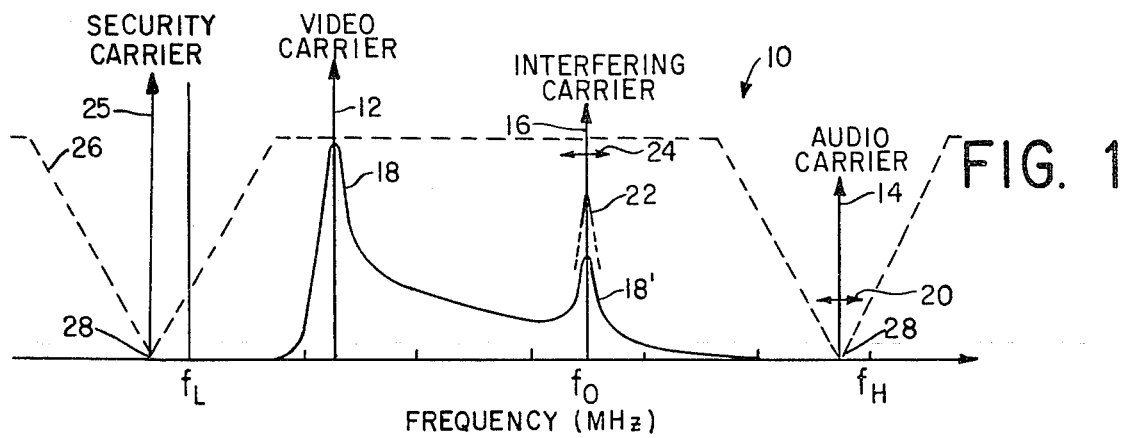
FIG. 1 is a frequency plot showing the spectrum of a composite radio frequency (RF) television signal modified in accordance with the present invention on which the frequency response curve of the video portion of a properly tuned receiver is superimposed in broken lines.

Referring now to the details of the drawings, and in particular to FIG. 1, there is shown the frequency spectrum of a composite RF television signal, indicated generally by the numeral 10, as modified in accordance with the present invention. Superimposed on the composite signal 10 is a wave shaft 26 (shown in broken lines) representing the frequency response curve of the video portion of a conventional television receiver which is properly tuned to the channel to be received. The television signal is included in a channel ranging in frequency from a lower bounding frequency $f_L$ to an upper bounding frequency $f_H$, with a difference between $f_H$ and $f_L$ of 6 megahertz. For example, if the signal 10 is being transmitted over channel 4, $f_L$ and $f_H$ are equal to 66 megahertz and 72 megahertz, respectively. By convention (in the United States), a video carrier signal 12 is provided at 1.25 megahertz above $f_L$ and an audio carrier signal 14 is provided at 5.75 megahertz above $f_L$. Thus, for a channel 4 signal, the video and audio carrier signals are at 67.25 and 71.75 megahertz, respectively. In addition to the conventional components just described, the television signal 10 also includes an interfering carrier signal 16 at a frequency $f_O$, which is intermediate the video and audio carrier frequencies and a security carrier signal 25 at a frequency $f_S$, which is outside the frequency range of the channel being received. For purposes of illustration, $f_O$ is shown in FIG. 1 as being half way between the video and audio carrier signals, or at a frequency of 69.5 megahertz for a channel 4 signal, and $f_S$ is shown at the frequency of the audio carrier of the next lower channel (i.e. channel 3 audio at 65.75 Mhz). However, the principles of the invention apply equally well if $f_O$ is spaced from the video carrier by a frequency which is an interger submultiple of 4.5 megahertz (preferably a low submultiple), as previously explained, and when $f_S$ is not precisely at the frequency of the lower adjacent channel audio carrier.

As is customary in commercial television broadcasting, the video carrier 12 is amplitude-modulated with video program information and the audio carrier 14 is frequency-modulated with audio program information. For illustrative purposes, the frequency spectrum of the modulated video carrier is schematically represented by waveform 18. It should be noted that the waveform 18 is preemphasized to produce a peak 18' in the vicinity of the frequency $f_O$ of the interfering carrier 16. The preemphasis compensates for the attenuation introduced in the vicinity of the frequency $f_O$ by the band-elimination filter which is provided at an authorized receiver to remove the interfering carrier signal, as described below. The spectrum of the modulated audio carrier signal 14 is not shown, but is represented schematically by the double-headed horizontal arrow 20 provided on the spectral line corresponding to the audio carrier 14.

Interfering carrier 16 is modulated with replacement information for the normal television program. In the embodiment of FIG. 1, the interfering carrier is amplitude-modulated with video information and frequency-modulated with audio information. The spectrum of the video information, which is represented by the partial waveform 22, is restricted to a narrow bandwidth of the order of magnitude of a conventional band-elimination filter so that it may be readily removed without appreciably degrading the normal video material. The spectrum of the audio portion of the substitute signal is not shown, but is represented schematically by the double-headed horizontal arrow 24 on interfering carrier 16.

It is believed that, when the composite signal 10 represented in FIG. 1, is applied to a conventional, properly tuned television receiver, the security carrier signal is substantially attenuated owing to the notch 28 in the frequency response curve 26 of the video portion of the receiver, so that the security carrier has no effect on picture reception. The non-linear characteristics of the receiver produce replicas of the various modulated carriers at frequencies equal to the sums and differences of the various carriers and harmonics thereof. In the absence of the interfering carrier (i.e., with a conventional television signal), the modulated video and audio carriers are non-linearly combined to provide a replica of the audio carrier modulation on an intermediate carrier of 4.5 megahertz (i.e., the difference between the audio and video carrier frequencies), and to provide a replica of the video carrier modulation ranging from 0 to 4 MHz. When the interfering carrier is present, a replica of the video signal modulation of this interfering carrier is provided in a narrow frequency band about 0 MHz and, in modified form, at 4.5 megahertz (i.e., the second harmonic of the difference between the interfering and video or audio carrier frequencies). The replicas of the modulated interfering carrier and audio carrier signals which are both at 4.5 megahertz compete for the FM channel, but the modulated interfering carrier replica, having a greater energy content, will capture the channel and will cause the normal audio signal to be suppressed as noise. It has been found that a modulated interfering carrier replica which is 6 dB above the modulated audio carrier replica is sufficient to capture the FM channel.

In a similar manner, the video and interfering carrier signal replicas at 0 MHz compete for the video channel. The interfering carrier amplitude modulation obliterates the normal video signal, probably, by virtue of two effects. First of all, the additional energy provided by the interfering carrier causes the automatic gain control of the receiver to drop the gain of the receiver down to a level where the reception of the normal video signal is unsatisfactory. In addition, the horizontal synchronizing pulses in the interfering carrier video signal (which are slightly off the standard sync pulses rate) tend to lock the synchronization circuits of the receiver to the interfering signal, so that the normal video signal appears to be out of synchronization. Thus, when the video portion of the interfering carrier captures the receiver, the normal video signal is not discernible, but merely appears as low-level background noise.

In an attempt to avoid the scrambling effect of the interfering carrier, for example on the video portion of the normal program, the receiver would be detuned so as to shift wave shape 26 to the left. In the absence of a security carrier, a conventional television receiver is capable of being detuned sufficiently to make the right-hand one of notches 28 coincide with frequency $f_O$, so that the interfering carrier is substantially attenuated by the notch and is prevented from interfering with picture reception. Detuning also removes the color carrier (not shown), which is intermediate the interfering and audio carriers, and prevents reception of sound. However, sound could be received on a second receiver by detuning that receiver to shift wave shape 26 to the right. Thus, an unauthorized party could receive a complete subscription program including sound and block-and-white picture by embodying two receivers.

Providing the security carrier at frequency $f_S$ prevents unauthorized reception of the subscription program. Should a receiver be detuned so as to shift waveshape 26 to the left with respect to the carrier, the security passes out of the lefthand one of notches 28 into the reception band and is received together with the modulated video carrier. When the righthand notch is shifted to $f_O$, the security carrier is completely unattenuated and, by enhancing the total energy in the received signal, causes the automatic gain control of the receiver to reduce the gain to a level at which the reception of the normal video signal is unsatisfactory. It has been found that a security carrier which has a peak amplitude as much as 12 dB below the video carrier, will provide a sufficient blocking effect. In addition, the security carrier may be amplitude modulated with a video interference signal (described in detail below) which produces a moving pattern on the receiver picture that is extremely annoying to a viewer.

Figure 2:
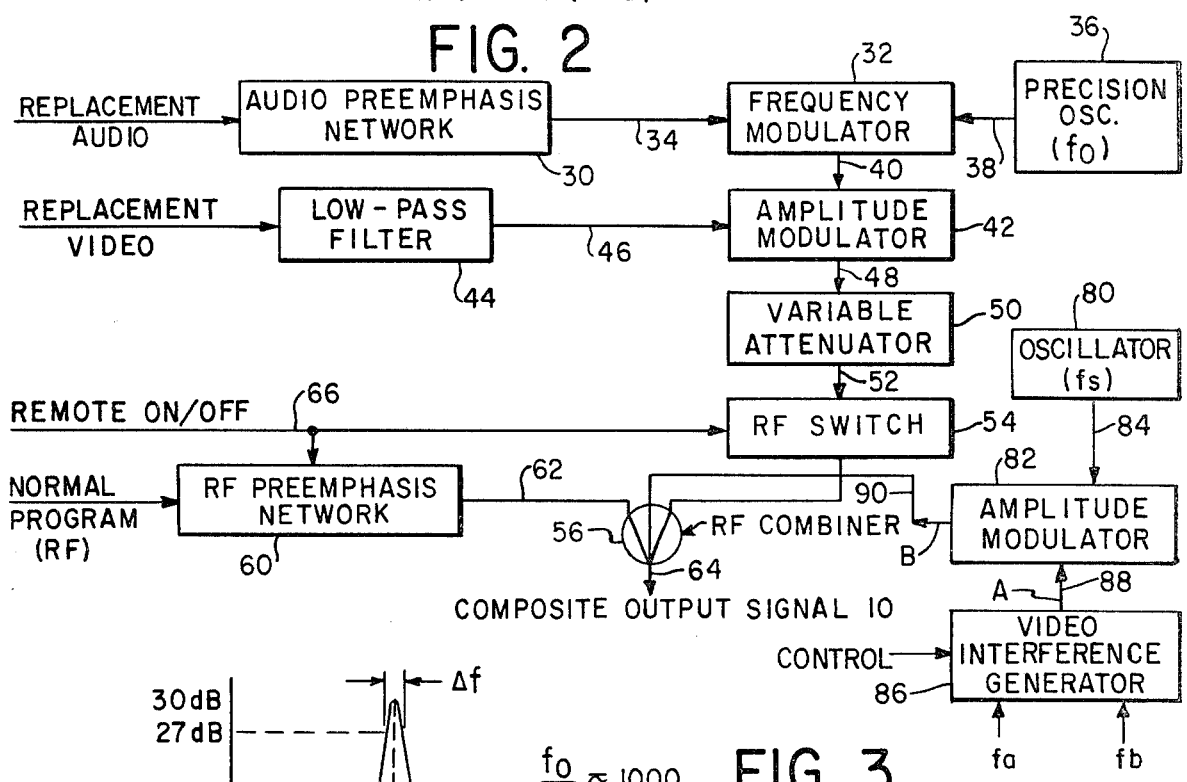
FIG. 2 is a functional block diagram illustrating the manner of modulating an interfering carrier with substitute program information, modulating a security carrier with a signal of time-varying frequency and combining the modulated interfering and security carriers with a standard television signal, in accordance with a preferred embodiment of the present invention.

Referring now to FIG. 2, there is shown an arrangement for producing the composite RF signal 10 illustrated in FIG. 1. A replacement program, including separate audio and video signals, is provided from a conventional source. As is common in conventional television transmitters, the replacement audio signal is supplied to an audio preemphasis network 30 prior to being utilized for modulating a carrier. The preemphasized audio signal is applied to a conventional frequency modulator 32 via lead 34 and is used to frequency-modulate a carrier signal of frequency $f_O$, which is supplied to modulator 32 from precision oscillator 36 via lead 38. The frequency-modulated carrier from modulator 32 is provided via lead 40 as the carrier input to a conventional amplitude-modulator 42. The replacement video signal serves as the modulating signal for amplitude-modulator 42 and is coupled thereto through a conventional low pass filter 44 and lead 46. Low pass filter 44 is designed to have an upper cutoff frequency substantially lower than is common in the video signal of conventional television systems, so that the spectrum for the amplitude-modulation of the interfering carrier will have a relatively narrow bandwidth, as previously explained. The relationship between the bandwidth of filter 44 and other components in the system is discussed more fully below. In the preferred embodiment, filter 44 has a half-power bandwidth of about 30 KHz. By virtue of the portion of the arrangement of FIG. 2 described thus far, a carrier of frequency $f_O$ is produced on lead 48, which carrier is frequency-modulated with replacement audio information and is amplitude-modulated with replacement video information.

The output signal from amplitude modulator 42 is coupled to a conventional variable attenuator 50 via lead 48, and is provided therefrom to an RF combiner 56 via lead 52 and RF switch 54. The normal television program signal is provided in radio frequency form (for example from a television transmitter), and is coupled via lead 58 to RF preemphasis network 60, in order to produce a sharp peak in the normal program signal in the vicinity of the interfering carrier frequency $f_O$. The preemphasized normal program signal is coupled from RF preemphasis network 60 to RF combiner 56 via lead 62. In operation, variable attenuator 50 is conveniently adjusted to control the magnitude of the interfering carrier relative to the video carrier so as to insure that the replacement signal captures the video and audio portions of a television receiver.

An externally applied remote on/off signal is provided on lead 66 and is coupled as a control signal to RF preemphasis network 60 and RF switch 54. With the remote on/off signal in its "on" condition, the RF switch is rendered conductive and the normal program signal is passed through RF preemphasis network 60, so that the composite output signal 10 produced on lead 64 includes an interference carrier modulated with substitute program information. With the remote on/off signal in the "off" condition, RF switch 54 is open and the normal program signal is made to bypass RF preemphasis network 60, so that the normal program signal appears on lead 64 and the interfering carrier is absent.

Security carrier 25 is generated by means of a conventional oscillator 80 and is provided to a conventional amplitude modulator 82 via lead 84. In addition, a video interference signal from a generator 86 is provided to modulator 82 via lead 88 and is utilized to amplitude modulate the security carrier. The modulated security carrier is coupled to RF combiner 56 via lead 90, and RF combiner 56 combines the normal program signal, the modulated interfering carrier and the modulated security carrier to produce, on lead 64, the composite signal 10 depicted in FIG. 1.

In operation, the security carrier is always present, but has no perceptible effect on operation when tuning is proper. The remote on/off signal is normally maintained in its "on" condition, so that the normal program is scrambled at an unauthorized receiver and the replacement program is received instead. It might be desirable, for example, to make the replacement program a promotional presentation intended to entice a non-subscriber into subscribing to the normal program. As an added enticement, at some time during the replacement program, the remote on/off signal could temporarily be placed in its "off" condition, thereby permitting the non-subscriber to see a short segment of the normal subscription program which is being transmitted. At the end of this segment, the remote on/off signal returns to its "on" condition, whereupon the signal received at the non-subscriber's receiver is once more scrambled. As explained above, when tuning is improper the security carrier acts to interfere with picture reception.

Figure 3:
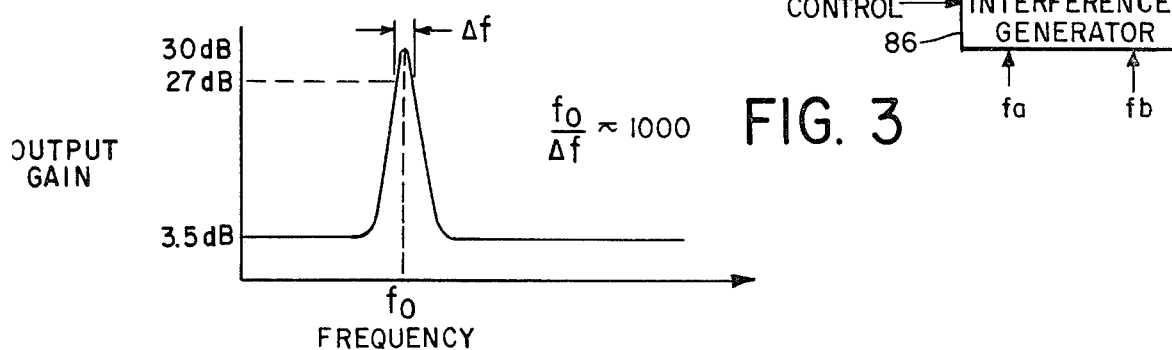
FIG. 3 is a frequency plot illustrating the preferred spectrum of an RF preemphasis network incorporated in the preferred embodiment of FIG. 2.

FIG. 3 illustrates a preferred gain versus frequency characteristics for RF preemphasis network 60 of FIG. 2. At frequencies substantially below and above the interfering carrier frequency $f_O$, preemphasis network 60 has a substantially constant gain, such as 3.5 dB, which compensates for losses due to combiner 56. The gain characteristic achieves a sharp peak, such as 30 db at the frequency $f_O$ and has a 3 db bandwidth, $\Delta F$, approximately equal to 0.001 $f_O$. Networks for achieving such gain characteristics are well-known in the prior art.

Figure 4:
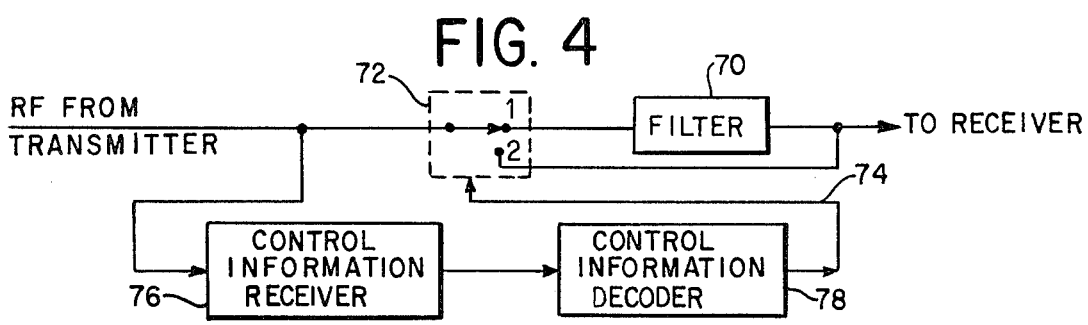
FIG. 4 is a functional block diagram illustrating the equipment that is incorporated at an authorized receiver to facilitate removal of the interfering carrier and the replacement program signal in order to permit reception of the regular subscription television program signal.

When composite television signal 10, as depicted in FIG. 1, is received at an authorized receiver, it is necessary that the interfering carrier and its modulation be removed from the composite signal before the signal is introduced into the receiver. Referring now to FIG. 4, it will be observed that the interfering carrier and its modulation are effectively removed by inserting a filter 70 ahead of an authorized receiver, so that the composite RF signal 10 from the transmitter is conditioned by the filter 70 prior to being applied to the authorized receiver. In a system with permanent subscribers, each authorized receiver would have a filter 70 permanently connected ahead of the receiver. Unauthorized receivers would not have such a filter, and would therefore receive a scrambled signal, together with the replacement program. It may be desirable, however, to authorize reception of subscription programs on a program-by-program basis. In such instances, the composite RF signal is coupled to the filter 70 through a switch 72 which is controlled by a signal applied to it via a lead 74, as will be more fully explained hereinafter. The switch has two positions, designated as 1 and 2 in FIG. 4. In position 1, the composite RF signal is coupled to the authorized receiver through filter 70 as explained above, but in position 2 the composite signal is bypassed around filter 70, so that the receiver receives the scrambled signal and replacement program.

The operation of switch 72 is conveniently controlled by means of an auxiliary control signal which is injected in the composite RF signal at a carrier frequency which is out of the video and audio spectra. A control information receiver 76 is provided in parallel with switch 72 to extract the control signal from the composite RF signal, and the signal extracted by receiver 76 is applied to a control information decoder 78. Decoder 78 interprets the control signal to determine whether the associated receiver is authorized to receive the particular program being transmitted. Decoder 78 produces, on lead 74, a signal which controls the position of switch 72 in accordance with whether the receiver is or is not authorized to receive the signal being transmitted. Devices such as switch 72, receiver 76 and decoder 78 are well-known in the art and have been used in the manner described herein.

Filter 70 is a sharply tuned band-elimination filter, commonly known as a "notch" filter. Preferably, filter 70 conforms generally to the frequency characteristic of FIG. 3 but is the complement thereof (i.e. the preferred characteristic for filter 70 is obtained by considering the vertical axis of the characteristic of FIG. 3 to be attenuation instead of gain) and includes a much sharper peak at the frequency $f_O$. When the frequency characteristic of filter 70 is closely matched to the frequency characteristic of RF preemphasis network 60 of FIG. 2, the interfering carrier 16 and its modulation are not only effectively removed, but the removal is achieved with minimal distortion of the original video signal spectrum. Thus, the preemphasis network 60 provides gain which compensates for attenuation introduced by filter 70 when producing normal programs. In the preferred embodiment, the attenuation of filter 70 in the immediate vicinity of the frequency $f_O$ substantially exceeds the maximum gain of preeemphasis network 60, but the "side" portions of the characteristics of filter 70 and network 60 are substantially identical. As a result the attenuation of filter 70 is only compensated at the side portions. This has the effect of making the attenuation characteristics of filter 70 appear much steeper to the normal television signal (i.e. only the uncompensated portion affects the normal television signal). This helps assure that the scrambling and signal substituting arrangement of the invention does not appreciably degrade the normal subscription television signal. Notch filters which satisfy the requirements of filter 70 are well-known in the art and are commercially available.

The attenuation characteristic of low-pass filter 44 is intimately related to the attenuation characteristic of filter 70. The general purpose of low-pass filter 44 is to limit the spectral content of the replacement video signal so that, when the interfering carrier is modulated with the replacement video signal and bandlimited by filter 44, no appreciable energy is produced outside of the attenuation "notch" of filter 70. Modulation theory teaches that the spectrum of the video modulated interfering carrier on either side of the carrier frequency will be a replica of the spectrum of the bandlimited replacement video signal. Consequently, low-pass filter 44 should be designed so that it produces no appreciable energy beyond a frequency equal to half the width of the "notch" in filter 70. The minimum bandwidth of low-pass filter 44 is selected in accordance with the requirement that the filter should not appreciably attenuate the 15 KHz horizontal synchronization signal. In the preferred embodiment, filter 70 has a maximum attenuation of about 80dB and filter 70 and low-pass filter 44 are designed so that all components of the video-modulated interfering carrier are attenuated by at least 55 dB.

Figure 5:
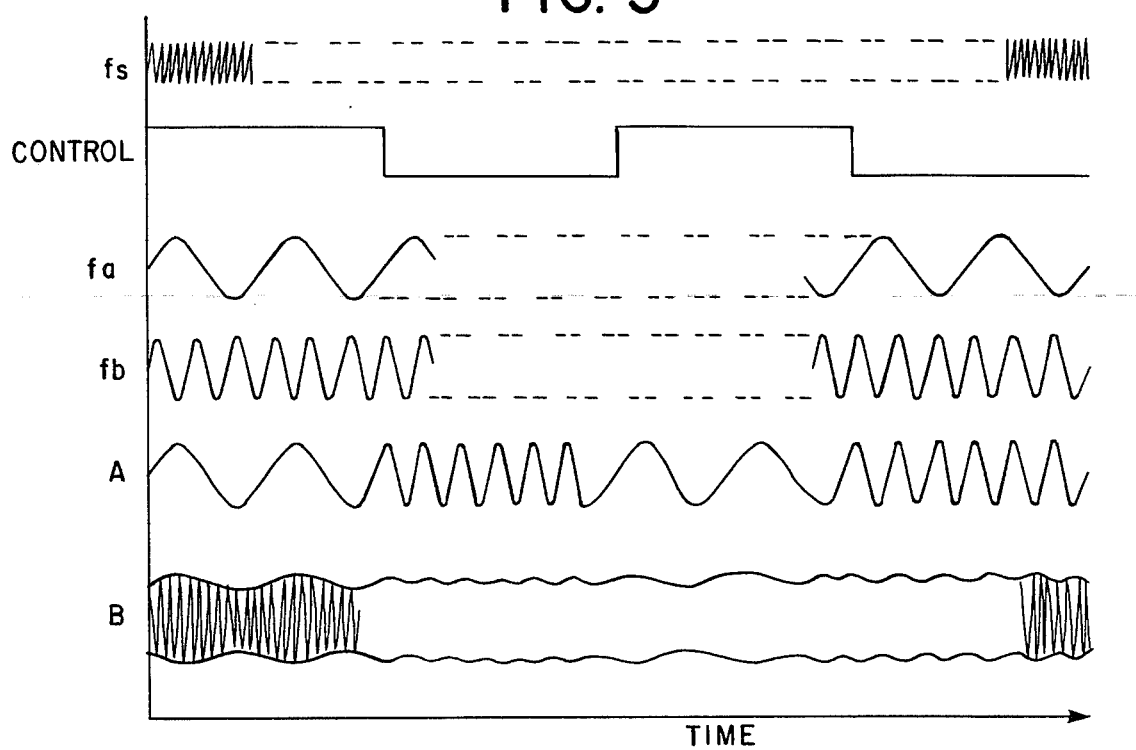
FIG. 5 is a waveform diagram useful in describing the manner of generating the modulated security carrier.

The production of the modulated security carrier will be described with the aid of the waveform chart of FIG. 5. The reference character for each waveform is indicated at the points where that waveform appears in FIGS. 2 and 6. Waveform $f_s$ is the output of oscillator 80 (i.e. the security carrier signal) and appears on lead 84. Waveform A, which appears on lead 88, is the video interference signal which is used to amplitude modulate the security carrier. Waveform A is produced by generator 86 by alternately transmitting sinusoids $f_a$ and $f_b$ at a periodic rate determined by the CONTROL waveform.

In the preferred embodiment, $f_a$ and $f_b$ are 4 Hz and 12 Hz sinusoids, respectively, and the CONTROL waveform is a 1 Hz square wave. Although this combination of signals has been found to produce an extremely effective and annoying interference pattern, other combinations will also work well. Alternately, the security carrier may be modulated by a single frequency or may be unmodulated. Waveform B is the security carrier amplitude modulated by waveform A and appears on lead 90. It has been found that a good interference pattern can be produced when the modulation extends 6-10 dB below the peak amplitude of the security carrier signal.

Figure 6:
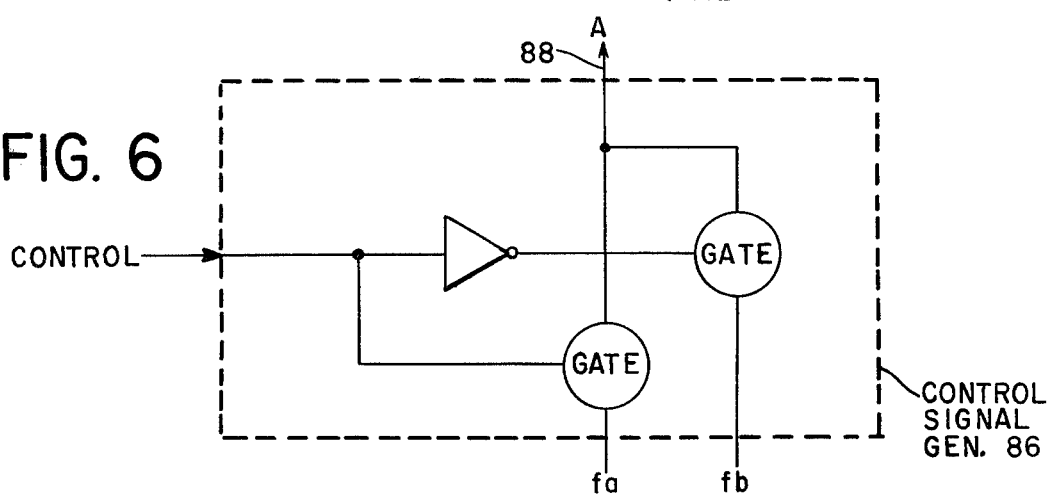
FIG. 6 is a circuit diagram illustrating how the modulating signal for the security carrier may be generated.

FIG. 6 is a circuit schematic diagram for control signal generator 86, which illustrates how waveform A may be generated. Waveforms $f_a$ and $f_b$ are each applied as an input to one of analog gates 92,94. The CONTROL waveform is applied as the control input to gate 92 via lead 96 and as the control input to gate 94 through an inverter 98. The output of each of gates 92,94 is applied to lead 88. In operation, each of gates 92,94 becomes transmissive when its control input is high, thereby passing its input signal (waveform $f_a$ or $f_b$ to lead 88. When the control input to the gate is low, it blocks transmission of its input signal. It will therefore be appreciated that gates 92, 94 transmit on alternate half-cycles of the CONTROL waveform, so that waveform A includes alternate bursts from the waveforms $f_a$ and $f_b$.

Figure 7:
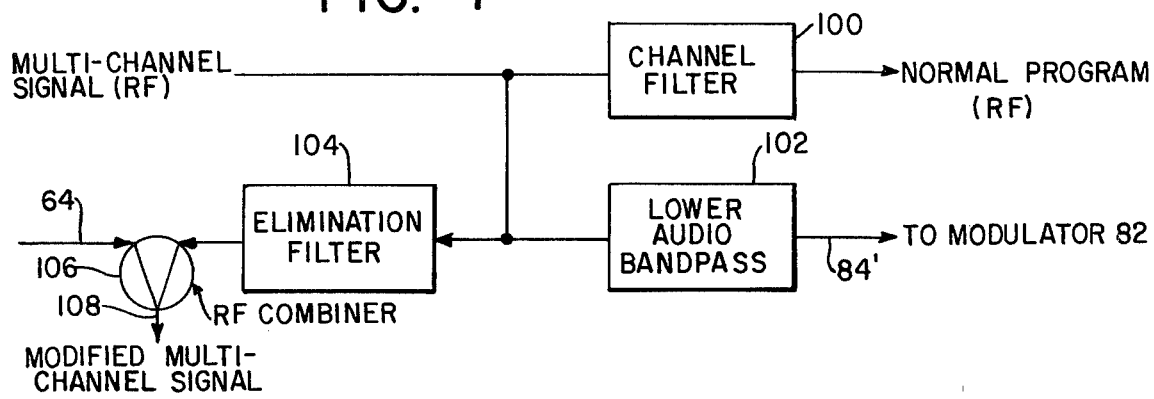
FIG. 7 is a functional block diagram showing how the block diagram of FIG. 2 is modified for operation with a multi-channel signal with adjacent channels occupied, such as is found, for example, in cable television systems.

In braodcast television it is the usual practice not to utilize channels in a common area channels which are adjacent in frequency. However, in cable television systems, for example, channels which are adjacent in frequency are utilized and a multichannel RF signal is usually provided. It then becomes possible to utilize the audio carrier signal of a lower adjacent channel as the security carrier for the channel being tuned in. FIG. 7 is a functional block diagram which can be used in combination with the diagram of FIG. 2 to provide scrambling of a television program while utilizing the lower adjacent audio carrier as a security carrier. The multichannel RF signal is applied to a channel filter 100 (which passes only the signal of the selected channel), a lower audio bandpass filter 102, and an elimination filter 104 (which transmits the multichannel signal while blocking the selected channel and the lower adjacent audio). The output of filter 100 is applied to RF preemphasis filter 60 (FIG. 2) as the normal program (RF) and the output of filter 102 is applied to modulator 82 (via lead 84') as the interfering carrier signal. The arrangement of FIG. 2 produces (on lead 64) the composite signal 10 for the selected channel, and this signal is combined with the output of elimination filer 104, in RF combiner 106, to produce a modified multichannel signal on lead 108. This modified signal is like the original multichannel signal except that the selected channel has a scrambled signal in which the lower adjacent audio carrier serves as a modulated security carrier. It has been found that the audio carrier can be substantially amplitude modulated without causing a perceptible adverse effect on lower adjacent channel sound reception.

Although specific embodiments of the invention have been disclosed for illustrative purposes, it will be appreciated by those skilled in the art that many additions, modifications and substitutions are possible without departing from the scope and spirit of the invention as defined in the accompanying claims. For example, the invention is not limited to conventional television systems which amplitude-modulate video information on a video carrier and frequency-modulate audio information on a audio carrier. Clearly, interfering carrier 16 and security carrier 25 could be modulated in any form which would be recognized by the video and audio sections of a receiver in a given television system in which scrambling, signal substitution and security against circumvention by detuning are to be achieved.

What is claimed is:

1. In a television communication system transmitting normal program information by means of a radio frequency signal disposed in a channel occupying a predetermined frequency band and including separate frequency-spaced audio and video carrier signals, said audio and video carrier signals being modulated, respectively, with the audio and video portions of said normal program information, the method of preventing reception of said normal program at a receiver with a predefined reception band when said receiver is detuned substantially from the nominal adjustment for receiving said channel, comprising the steps of:

producing a security carrier signal together with said transmitted normal program information at a frequency outside said predetermined frequency band and sufficiently removed therefrom in frequency to avoid any appreciable interference with reception when said receiver is in said nominal adjustment, the frequency of said security carrier being selected to permit reception of adjacent channels when said receiver is detuned substantially from said nominal adjustment; and linearly combining said security carrier signal with said radio frequency signal.

2. The method of claim 1 wherein the amplitude of said security carrier signal lies in a range including and extending above a minimum level of 16 dB below the unmodulated amplitude of said video carrier.

3. The method of claim 1 wherein said security carrier is modulated prior to said combining step.

4. In a television communication system transmitting normal program information by means of a radio frequency signal disposed in a channel occupying a predetermined frequency band and including separate frequency-spaced audio and video carrier signals, said audio and video carrier signals being modulated, respectively, with the audio and video portions of said normal program information, the method of preventing reception of said normal program at a receiver with a predefined reception band when said receiver is detuned substantially from the nominal adjustment for receiving said channel, comprising the steps of:

producing a security carrier signal at a frequency outside said reception band and sufficiently removed therefrom in frequency to avoid any appreciable interference with reception when said receiver is in said nominal adjustment;

amplitude modulating said security carrier alternately with first and second interference signals of different frequency at a rate determined by the frequency of a control signal; and linearly combining said security carrier signal with said radio frequency signal.

5. The method of claim 4 wherein said first and second interfering signals have frequencies of approximately 4 Hz and 12 Hz, respectively, and said control signal has a frequency of approximately 1 Hz.

6. The method of claim 4 wherein said security carrier is modulated to a depth of 6-10db below its peak amplitude.

7. In a television communication system transmitting normal program information by means of a radio frequency signal disposed in a channel occupying a predetermined frequency band and including separate frequency-spaced audio and video carrier signals, said audio and video carrier signals being modulated, respectively, with the audio and video portions of said normal program information, the method of preventing reception of said normal program at a receiver with a predefined reception band when said receiver is detuned substantially from the nominal adjustment for receiving said channel, said method also conditioning said frequency signal so that said normal program information is blocked from reproduction in a television receiver while replacement program information is reproduced in place thereof, said method comprising the steps of:

producing a security carrier signal at a frequency outside said reception band and sufficiently removed therefrom in frequency to avoid any appreciable interference with reception when said receiver is in said nominal adjustment;

generating an interfering carrier signal at a frequency intermediate said audio and video carrier signals;

modulating said interfering carrier signal with said replacement program information; and linearly combining the modulated interfering carrier signal and said security carrier signal with said radio frequency signal.

8. In a television communication system transmitting normal program information by means of a radio frequency signal disposed in a channel occupying a predetermined frequency band and including separate frequency-spaced audio and video carrier signals, said audio and video carrier signals being modulated, respectively, with the audio and video portions of said normal program information, apparatus for preventing reception of said normal program at a receiver with a predefined reception band when said receiver is detuned substantially from nominal adjustment for receiving said channel, said apparatus comprising:

a source of a security carrier signal at a frequency outside said predetermined frequency band and sufficiently removed therefrom in frequency to avoid any appreciable interference with reception when said receiver is in said nominal adjustment, the frequency of said security carrier being selected to permit reception of adjacent channels when said receiver is detuned substantially from said nominal adjustment; and a combiner for combining said security carrier signal with said radio frequency signal.

9. Apparatus in accordance with claim 8 wherein said source provides a security carrier signal with an amplitude which lies in a range including and extending above a minimum level of 16 dB below the unmodulated amplitude of said video carrier.

10. Apparatus in accordance with claim 8 further comprising means for modulating said security carrier ahead of said combiner.

11. In a television communication system transmitting normal program information by means of a radio frequency signal disposed in a channel occupying a predetermined frequency-spaced audio and video carrier signals, said audio and video carrier signals being modulated, respectively, with the audio and video portions of said normal program information, apparatus for preventing reception of said normal program at a receiver with a predefined reception band when said receiver is detuned substantially from nominal adjustment for receiving said channel, said apparatus comprising:

a source of a security carrier signal at a frequency outside said reception band and sufficiently removed therefrom in frequency to avoid any appreciable interference with reception when said receiver is in said nominal adjustment;

means for producing first and second interference signals of different frequency and a control signal of a preselected frequency;

an interference signal generator responsive to said control signal to alternately transmit said interference signals, the signal transmitted by said interference signal generator being provided as an amplitude modulation-determining input to said modulating means; and a combiner for combining said security carrier signal with said radio frequency signal.

12. Apparatus in accordance with claim 11 wherein said first and second interfering signals are produced with frequencies of approximately 4 Hz and 12 Hz, respectively, and said control signal is selected to have a frequency of approximately 1 Hz.

13. Apparatus according to claim 11 wherein said modulating means amplitude modulates said security carrier to a depth of 6–10 db below its peak amplitude.

14. In a television communication system transmitting normal program information by means of a radio frequency signal disposed in a channel occupying a predetermined frequency-spaced audio and video carrier signals, said audio and video carrier signals being modulated, respectively, with the audio and video portions of said normal program information, apparatus for preventing reception of said normal program at a receiver with a predefined reception band when said receiver is detuned substantially from nominal adjustment for receiving said channel, said apparatus also conditioning said radio frequency signal so that said normal program information is blocked from reproduction in a television receiver while replacement program information is reproduced in place thereof, said apparatus comprising:

a source of a security carrier signal at a frequency outside said reception band and sufficiently removed therefrom in frequency to avoid any appreciable interference with reception when said receiver is in said normal adjustment;

a generator for an interfering carrier signal at a frequency intermediate said audio and video carrier signals;

means for modulating said interfering carrier signal with said replacement program information; and a combiner for combining the modulated interfering carrier signal and said security carrier signal with said radio frequency signal.

15. A transmitter for use in a television communication system for normal program material incorporating audio and video information, said transmitter producing a composite radio frequency signal in an assigned channel occupying a predetermined frequency band, said composite radio frequency signal comprising:

an audio carrier signal at a frequency in said band, said audio carrier signal being modulated with said audio information;

a video carrier signal at a different frequency in said band, said video carrier signal being modulated with said video information; and a security carrier signal at a frequency outside said predetermined frequency band and sufficiently removed therefrom in frequency to avoid any appreciable interference with reception in a receiver which is nominally adjusted to receive said channel, said security carrier frequency being selected to prevent receipt of said normal program when said receive is detuned from the nominal adjustment while permitting receipt of an adjacent channel.

16. A transmitter in accordance with claim 15 wherein the amplitude of said security carrier signal lies in a range including and extending above a minimum level of 16 dB below the unmodulated amplitude of said video carrier.

17. A transmitter in accordance with claim 15 wherein said security carrier is modulated.

18. A transmitter for use in a television communication system for normal program material incorporating audio and video information, said transmitter producing a composite radio frequency signal for reception on a channel occupying a predetermined frequency band, said composite radio frequency signal comprising:

an audio carrier signal at a frequency in said band, said audio carrier signal being modulated with said audio information;

a video carrier signal at a different frequency in said band, said video carrier signal being modulated with said video information; and a security carrier signal at a frequency outside said reception band and sufficiently removed therefrom in frequency to avoid any appreciable interference with reception in a receiver which is nominally adjusted to receive said channel, said security carrier preventing receipt of said normal program when said receiver is detuned from the nominal adjustment; and a source of first and second interference signals of different frequency and a control signal of a third frequency, said security carrier signal being alternately amplitude modulated by said interference signals on alternate half-cycles of said control signal.

19. A transmitter in accordance with claim 18 wherein said first and second interfering signals have frequencies of approximately 4 Hz and 12 Hz, respectively, and said control signal has a frequency of approximately 1 Hz.

20. The transmitter of claim 18 wherein said security carrier is modulated to a depth of 6–10 db below its peak amplitude.

21. A transmitter for use in a television communication system for normal program material incorporating audio and video information, said system including a source of replacement program information, said transmitter producing a composite radio frequency signal for reception on a channel occupying a predetermined frequency band, said composite radio frequency signal comprising:

an audio carrier signal at a frequency in said band, said audio carrier signal being modulated with said audio information;

a video carrier signal at a different frequency in said band, said video carrier signal being modulated with said video information;

a security carrier signal at a frequency outside said reception band and sufficiently removed therefrom in frequency to avoid any appreciable interference with reception in a receiver which is nominally adjusted to receive said channel, said security carrier preventing receipt of said normal program when said receiver is detuned from the nominal adjustment; and an interfering carrier signal at a frequency intermediate the frequencies of said audio and video carrier signals and being modulated with said replacement program information so that said normal program information is blocked and said replacement program information is received in place thereof when said composite radio frequency signal is applied to a television receiver.

22. A transmitter in accordance with claim 21 wherein the frequency of said interfering carrier signal is selected so that the frequency difference between said audio and video carrier signals is an integral multiple of the frequency difference between said interfering carrier signal and one of said audio and video carrier signals.

23. A transmitter in accordance with claim 21 wherein said replacement program information incudes both video and audio components, said interfering carrier signal being modulated with said audio and video components, the audio and video components modulating said interfering carrier signal with different forms of modulation.

24. A transmitter in accordance with claim 23 wherein said audio component modulates said interfering carrier signal with the same form of modulation that is used to modulate said audio carrier signal and said video component modulates said interfering carrier with the same form of modulation that is used to modulate the said video carrier signal.

25. A transmitter in accordance with claim 24 wherein said audio carrier signal is frequency-modulated with said audio information and said video carrier signal is amplitude-modulated with said video information, said interfering carrier signal being frequency-modulated with said audio component and amplitude-modulated with said video component.

26. A transmitter in accordance with claim 21 in combination with at least one television receiver having a non-linear response to said radio frequency signal so that replicas of component carrier signal frequencies thereof are reproduced at a predefined intermediate frequency, said modulated interfering carrier signal having sufficient energy so that a replica thereof at said intermediate frequency exceeds in energy a replica of said modulated audio carrier signal at said intermediate frequency, whereby said modulated interfering carrier signal captures the audio reproducing portion of said receiver.

27. A transmitter in accordance with claim 21 wherein said modulated video carrier signal includes a normal synchronization signal, said transmitter being combined with a television receiver having a video section with at least one synchronization circuit, and a source of said replacement program material providing at least replacement video information including a replacement synchronization signal, said replacement synchronization signal being adapted to lock said synchronization circuit thereto so that said modulated video carrier appears to be out of synchronization, whereby said replacement video information is reproduced in said receiver, with video information from said modulated video carrier appearing as background noise.

28. A transmitter in accordance with claim 21 wherein said interfering carrier signal has a magnitude comparable to said video carrier signal, said transmitter being combined with a receiver having a conventional automatic gain control circuit for controlling the amplification of applied radio frequency signals, so that said automatic gain control circuit reduces the amplification of said normal program material, thereby blocking the reception of said modulated video carrier signal and enabling said receiver to reproduce said replacement video signal in place thereof.

29. In a television communication system transmitting normal program information by means of a radio frequency signal disposed in a channel occupying a predetermined frequency band in a multichannel signal including an additional channel adjacent to said band and having an audio carrier near said band, said radio frequency signal including separate frequency-spaced audio and video carrier signals, said audio and video carrier signals being modulated, respectively, with the audio and video portions of said normal program information, the method of preventing reception of said normal program at a receiver with a predefined reception band when said receiver is detuned substantially from the nominal adjustment for receiving said channel, comprising the step of amplitude modulating the audio carrier of the additional channel.

30. The method of claim 29 wherein said security carrier is alternately amplitude modulated with first and second interference signals of different frequency at a rate determined by the frequency of a control signal.

31. In combination with the method of claim 29, the method of conditioning said radio frequency signal so that said normal program information is blocked from reproduction in a television receiver while replacement program information is reproduced in place thereof, said method comprising the steps of:
  generating an interfering carrier signal at a frequency intermediate said audio and video carrier signals;
  modulating said interfering carrier signal with said replacement program information; and
  linearly combining the modulated interfering carrier signal with said radio frequency signal.

32. The method of claim 31 wherein the frequency of said interfering carrier signal is selected so that the frequency difference between said audio and video carrier signals is an integral multiple of the frequency difference between said interfering carrier signal and one of said audio and video carrier signals.

33. The method of claim 31 wherein said interfering carrier signal is modulated with both audio and video information from said replacement program, said interfering carrier signal being modulated with the audio and video information by different methods of modulating.

34. The method of claim 33 wherein said interfering carrier signal is modulated by audio information by the same modulating method that is used to modulate said audio carrier signal and said interfering carrier is modulated by video information by the same modulating method that is used to modulate said video carrier signal.

35. The method of claim 34, employed in a television system including a conventional receiver with a non-linear response to said conditioned radio frequency signal whereby replicas of component carrier frequencies thereof are reproduced at a predefined intermediate frequency, said interfering carrier signal being modulated with at least replacement audio information in a manner that produces greater energy in the replica of the audio-modulated interfering carrier signal at said intermediate frequency than is present in the replica of said modulated audio carrier signal at said intermediate frequency, whereby said modulated interfering carrier signal captures the audio-reproducing portion of said receiver.

36. The method of claim 31 employed in a television communication system including a receiver having a video section with at least one synchronization circuit and a modulated video carrier signal including a normal synchronization signal, said method including the further step of producing a replacement program information signal with at least replacement video information and including a replacement synchronization signal, said replacement synchronization signal being adapted to lock said synchronization circuit thereto so that said modulated video carrier appears to be out of synchronization whereby said replacement video signal is reproduced in said receiver with video information from said modulated video carrier appearing as background noise.

37. The method of claim 31 employed in a television communication system including a receiver having a conventional automatic gain control circuit for controlling the amplification of applied radio frequency signals, said interfering carrier signal being generated with a magnitude comparable to said video carrier signal magnitude, so that said automatic gain control circuit reduces the amplification of said video-modulated video carrier signal to block the reception thereof and to reproduce said replacement video signal in place thereof.

38. In a television communication system transmitting normal program information by means of a radio frequency signal disposed in a channel occupying a predetermined frequency band in a multichannel signal including an additional channel adjacent to said band and having an audio carrier near said band, said radio frequency signal including separate frequency-spaced audio and video carrier signals, said audio and video carrier signals being modulated, respectively, with the audio and video portions of said normal program information, apparatus for preventing reception of said normal program at a receiver with a predefined reception band when said receiver is detuned substantially from the nominal adjustment for receiving said channel, comprising:
means for extracting the audio carrier of the additional channel from the multichannel signal,
means for amplitude modulating the extracted audio carrier of the additional channel, and
means for reinserting the amplitude modulated audio carrier into the multichannel signal.

39. Apparatus in accordance with claim 38 further comprising:
means for producing first and second interference signals of different frequency and a control signal of a preselected frequency; and
an interference signal generator responsive to said control signal to alternately transmit said interference signals during alternate half-cycles of said control signal, the signal transmitted by said interference signal generator being provided as an amplitude modulation-determining input to said modulating means.

40. In combination with the apparatus of claim 38, apparatus for conditioning said radio frequency signal so that said normal program information is blocked from reproduction in a television receiver while replacement program information is reproduced in place thereof, said apparatus comprising:
a generator of an interfering carrier signal at a frequency intermediate said audio and video carrier signals;
means for modulating said interfering carrier signal with said replacement program information; and
a combiner for combining the modulated interfering carrier signal with said radio frequency signal.

41. Apparatus in accordance with claim 40 wherein said generating means produces said interfering carrier signal at a carrier frequency such that the frequency difference between said audio and video carrier signals is an integral multiple of the frequency difference between said interfering carrier signal and one of said audio and video carrier signals.

42. Apparatus in accordance with claim 40 wherein said replacement program includes audio and video information, said modulating means including a first modulator modulating said interfering carrier signal with replacement audio information, and a second modulator modulating said interfering carrier signal by said replacement video information, said first and second modulators providing different kinds of modulation of said interfering carrier signal.

43. Apparatus in accordance with claim 42 wherein said first modulator modulates said interfering carrier signal by the same type of modulation as is used to modulate said audio carrier signal with audio information and said second modulator modulates said interfering carrier signal by the same type of modulation as is used to modulate said video carrier signal with video information.

44. Apparatus in accordance with claim 43 employed in a television system wherein said receiver has a nonlinear response to said radio frequency signal so that replicas of component carrier frequencies thereof are reproduced at a predefined intermediate frequency, said first modulator being constructed and arranged to provide an audio-modulated interfering carrier signal having a replica thereof produced at said intermediate frequency, which replica exceeds in energy the replica of said modulated audio carrier signal at said intermediate frequency, whereby said modulated interfering carrier signal captures the audio reproducing portion of said receiver.

45. In a television communication system incorporating apparatus in accordance with claim 40 wherein said receiver has a video section with at least one synchronization circuit and said modulated video carrier includes a normal synchronization signal, a source of said replacement program information providing at least replacement video information including a replacement synchronization signal being adapted to lock said synchronization circuit thereto so that said modulated video carrier appears to be out of synchronization, whereby said replacement video information is reproduced in said receiver with video information from said modulated video carrier appearing as background noise.

46. In a television communication system incorporating apparatus in accordance with claim 40 wherein said receiver has a conventional automatic gain control circuit for controlling the amplification of applied radio frequency signal, said interfering carrier signal generator being constructed and arranged so that said interfering carrier signal has a magnitude comparable to said video carrier signal, so that said automatic gain control circuit reduces the amplification of said normal program information, thereby blocking the reception of said modulated video carrier signal and enabling said receiver to reproduce said replacement video signal in place thereof.

* * * * *